United States Patent [19]

Miura

[11] Patent Number: 5,436,731
[45] Date of Patent: Jul. 25, 1995

[54] IMAGE PROCESSING APPARATUS WITH MONITORING MEANS

[75] Inventor: Shigeo Miura, Tokyo, Japan

[73] Assignee: Canon Kabushiki Kaisha, Tokyo, Japan

[21] Appl. No.: 650,773

[22] Filed: Feb. 5, 1991

[30] Foreign Application Priority Data

Feb. 6, 1990 [JP] Japan .................................. 2-25084

[51] Int. Cl.⁶ .............................................. H04N 1/04
[52] U.S. Cl. .................... 358/409; 358/468; 358/422; 395/550; 340/825.16; 371/61; 371/16.5; 371/14
[58] Field of Search ............... 358/468, 437, 406, 409, 358/410, 412, 413, 422, 420, 421, 423; 395/550, 575; 340/825.16; 371/61, 16.5, 68.3, 14

[56] References Cited

U.S. PATENT DOCUMENTS

| | | | |
|---|---|---|---|
| 4,839,698 | 6/1989 | Inuzuka et al. | 355/243 |
| 4,926,310 | 5/1990 | Inuzuka et al. | 364/186 |
| 4,942,478 | 7/1990 | Yamagishi et al. | 358/409 |
| 5,068,853 | 11/1991 | Soma et al. | 371/14 |

Primary Examiner—Curtis Kuntz
Assistant Examiner—Ping W. Lee
Attorney, Agent, or Firm—Fitzpatrick, Cella, Harper & Scinto

[57] ABSTRACT

An image processing apparatus is provided with a counter counted up by the clock of a main CPU and reset by the clock of a subordinate CPU. If the value of the count recorded by the counter is not within a fixed range for a predetermined period of time, the apparatus is judged to have developed an abnormality and a power supply for driving components under the control of the subordinate CPU is turned off. Thus, current supplied by the power supply to such components as a recording motor, thermal head, reading motor, fluorescent lamp, stamping plunger and cutter motor is cut off. Thereafter, even if the apparatus returns to normalcy, the driving power supply for the components under the control of the subordinate CPU will not turn on until the main CPU issues a trigger signal. As a result, the main CPU and subordinate CPU are monitored simultaneously, and if either CPU goes out of control, this can be sensed promptly, the driving power of the components under the control of the subordinate CPU is turned off, and accidents such as emission of smoke and burning can be prevented before they occur. Thus, the facsimile apparatus is extremely safe.

36 Claims, 8 Drawing Sheets

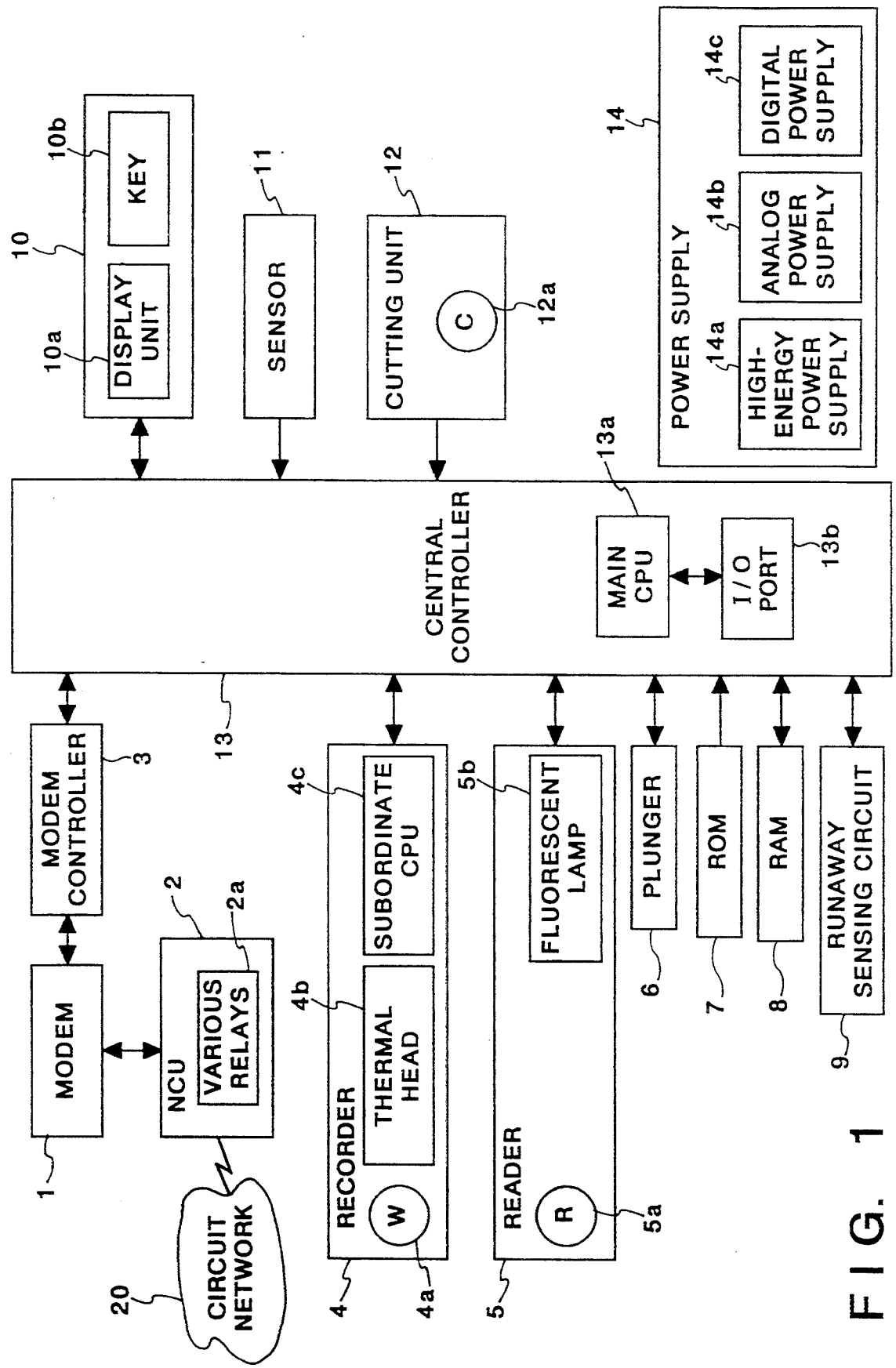
F I G. 1

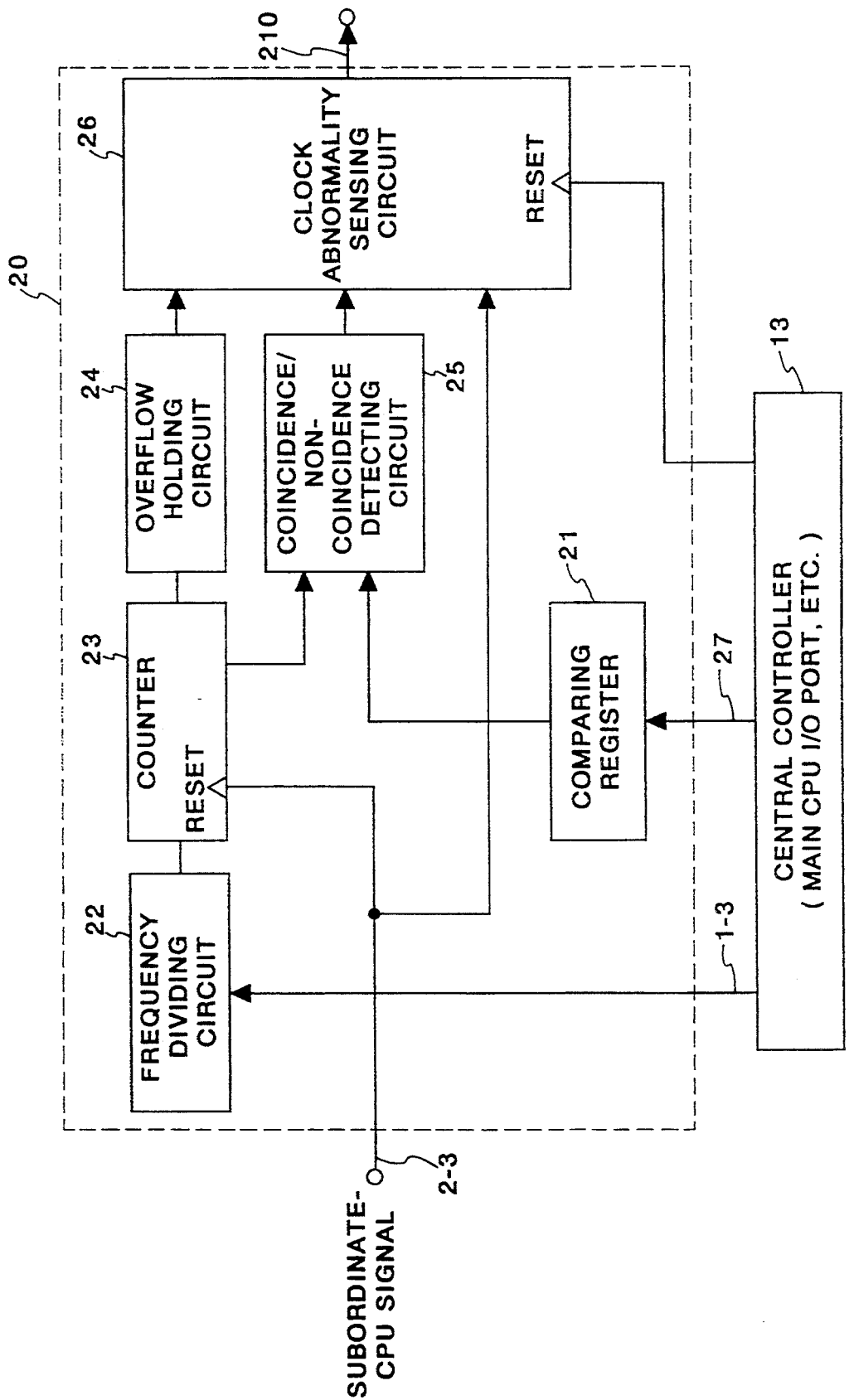
F I G. 3

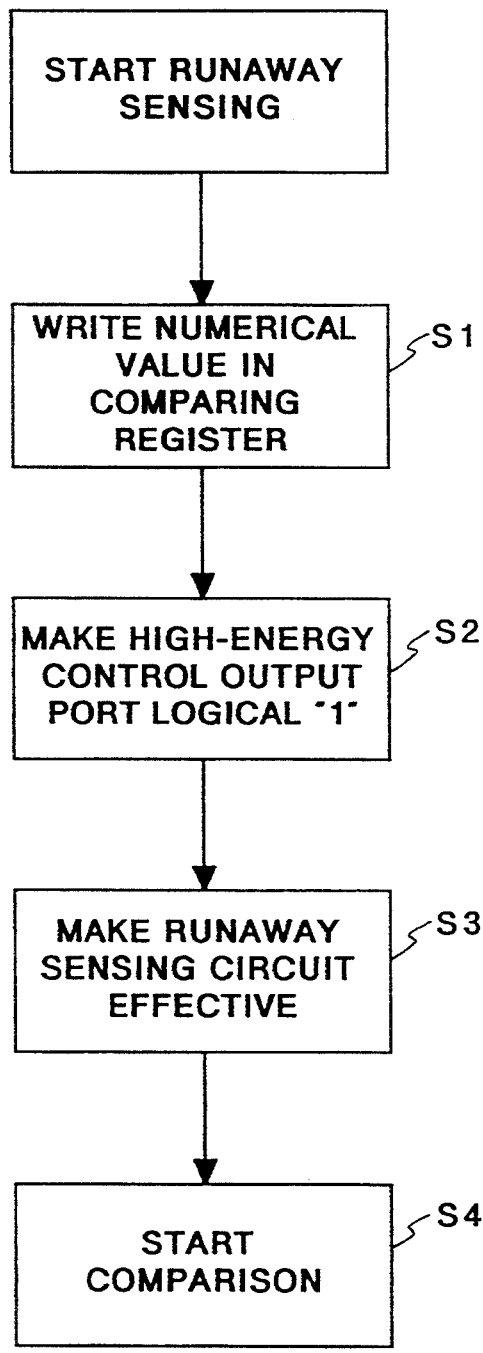
F I G. 5
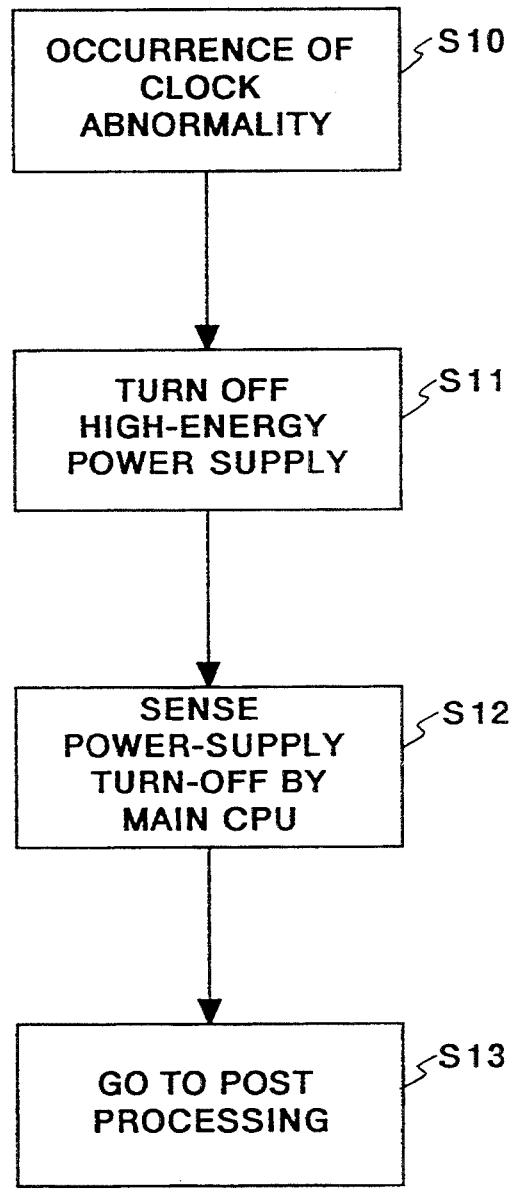
F I G. 6

IMAGE PROCESSING APPARATUS WITH MONITORING MEANS

BACKGROUND OF THE INVENTION

This invention relates to an image processing apparatus equipped with a main CPU mainly for controlling electric circuitry, and a subordinate CPU mainly for controlling other systems, such as a recording/reading mechanism.

In such a conventional apparatus of this kind as a facsimile apparatus, primarily the following methods are used as measures to prevent "runaway" (a phenomenon in which a CPU goes out of control, as when the CPU clock develops an abnormality, thus causing the program to jump to the wrong location) of the subordinate CPU which controls such systems as the recording system of the facsimile apparatus:

(1) The subordinate CPU is monitored by the main CPU. When the main CPU senses an abnormality in the subordinate CPU, either the subordinate CPU or a high-energy power supply for operating the recording system, etc., controlled by the subordinate CPU is shut down under the control of the main CPU.

(2) The system clock of the subordinate CPU is monitored by a watching circuit or the like, and a high-energy power supply is shut down when the system clock stops.

However, a major problem is encountered in the conventional method (1) described above. Specifically, if the main CPU should develop runaway, it will no longer be able to monitor the subordinate CPU. When both the main CPU and subordinate CPU develop runaway, the recording system can malfunction, the motor and thermal head may emit smoke and burn, and develop into a fire.

In this case, an expedient can be adopted in which the main CPU is monitored by a watching circuit and the power supply of the recording system is turned off when the system clock of the main CPU stops.

With the conventional watching circuit, however, any instantaneous abnormality in the system clock cannot be sensed and runaway cannot be detected without fail. Moreover, since the reaction speed of a watching circuit is slow, there are instances where the power supply of the recording system is turned off after the main or subordinate CPU has developed runaway and the recording system components such as the motor or thermal head have already begun to smoke and burn. Thus, this expedient does not fully perform its function in terms of preventing emission of smoke and burning.

Likewise, the conventional method (2) described above also does not completely play its role in terms of the reaction speed of the watching circuit and the perfection with which the watching circuit monitors runaway of the subordinate CPU.

SUMMARY OF THE INVENTION

An object of the present invention is to provide an image processing apparatus in which, through a simple arrangement, a main CPU and a subordinate CPU are simultaneously monitored, runaway in both CPU's is sensed promptly and the driving power supply of the object controlled by the subordinate CPU is turned off to prevent an accident such as the emission of smoke or burning before it occurs.

Another object of the present invention is to provide an image processing apparatus in which even if a subordinate CPU or main CPU repeatedly exhibits normal and abnormal conditions in intermittent fashion, a power supply can be prevented from being repeatedly turned on and off intermittently, thereby preventing such abnormal operations as loss of synchronization in the motor drive circuit or random loss of data in a printout.

According to the present invention, the foregoing objects are attained by providing a facsimile apparatus comprising operating-signal output means for outputting an operating signal of a predetermined period when a subordinate CPU is operating normally, monitoring means for comparing the period of the operating signal from the operating-signal output means with the period of a clock which operates a main CPU, and for performing monitoring to determine whether a ratio of the compared periods is less than a fixed amount or greater than a fixed amount, and power-supply control means for turning off a driving power supply of an object, which is controlled by the subordinate CPU, when the monitoring means senses that the operating signal is outside a predetermined range of the period at which the operating signal is generated.

In the arrangement described above, a simple and inexpensive circuit is provided for comparing the period of the operating signal of the subordinate CPU and the period of the clock which operates the main CPU. As a result, the main CPU and subordinate CPU are monitored simultaneously, runaway in both of these CPU's is sensed promptly, and the driving power supply of the object under the control of the subordinate CPU can be turned off to prevent an accident such as the emission of smoke or burning before it occurs.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram illustrating the construction of a facsimile apparatus according to an embodiment of the present invention;

FIG. 3 is a detailed block diagram showing the principal portion of a runaway sensing circuit in this embodiment;

FIGS. 5 through 7 are operation flowcharts for controlling the high-energy power supply primarily of a main CPU in this embodiment;

DESCRIPTION OF THE PREFERRED EMBODIMENT

Figure 2:
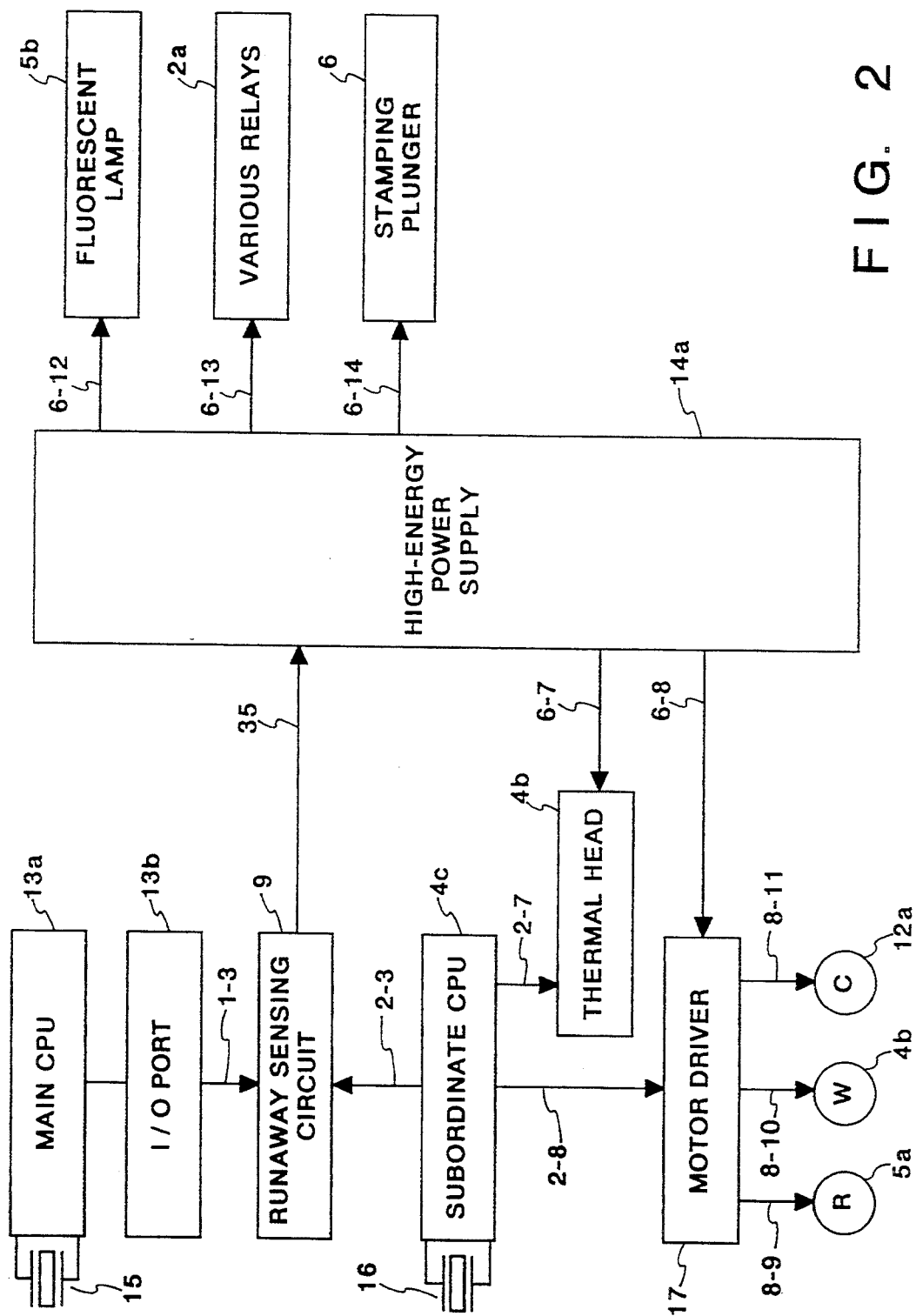
FIG. 2 is a diagram showing the connection of a high-energy power supply mainly to the thermal head and motor of the facsimile apparatus of this embodiment.

An embodiment of the present invention will now be described with reference to the drawings.

FIG. 1 is a block diagram illustrating a facsimile apparatus embodying the present invention.

In FIG. 1, numeral 1 denotes a modem for modulating transmission data and demodulating received data in order to perform facsimile communication with another facsimile apparatus via a circuit network 20. Numeral 2 designates a network control unit (NCU) for interfacing the circuit network 20. The NCU 2 has various relays 2a for maintaining a current loop of a connected circuit and performing channel control.

Numeral 3 denotes a modem controller for controlling the modem 1, and 4 a recording unit for printing out a received image or copy image on recording paper. The recording unit 4 comprises a recording motor 4a which operates a drive system for conveying and ejecting the recording paper, a thermal head 4b which, under the control of a subordinate CPU 4c, converts electrical energy into thermal energy to heat the recording paper, such as a thermosensitive recording paper, on which printing is performed, thereby printing out image information indicative of a received facsimile image or image information indicative of a copy image, (or a bubble jet-type ink-jet recording thermal head which produces bubbles by thermal energy, ejects an ink to record an image on the recording paper), and a CPU 4c for controlling the recording motor 4a and thermal head 4b and transmitting a subordinate CPU clock signal, which is an operating signal, to a runaway sensing circuit 9.

Numeral 5 denotes a reading unit for converting image information, which is indicative of a document to be transmitted, into an image signal. The reading unit 5 includes a reading motor 5a for operating the drive system of the reading unit 5, namely conveyance means and the like for the transmitted document, and a fluorescent lamp 5b for irradiating the transmitted document to facilitate the reading thereof as well as the conversion thereof into image signals.

Figure 7:
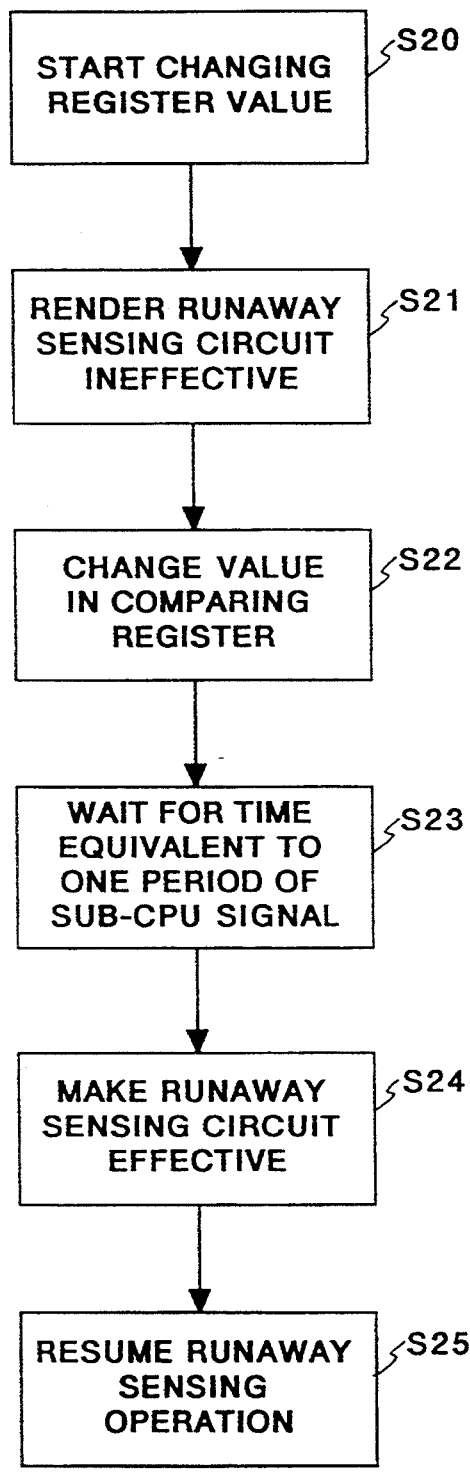

Numeral 6 denotes a stamping plunger for stamping a transmitted document with a mark indicating that the document has been transmitted, 7 a ROM which stores control procedures, shown in FIGS. 5 through 7, of a main CPU 13a, 8 a RAM for storing image data and the like, and 9 the aforementioned runaway sensing circuit, which is a characterizing feature of this embodiment. The runaway sensing circuit 9 monitors the subordinate CPU clock signal from the subordinate CPU 4c and the status of the operating clock signal of the main CPU.

Numeral 10 denotes a control panel which includes a display unit 10a for displaying various information, and a keyboard (KEY) 10b for registering data as well as inputs which instruct the facsimile apparatus to perform various operations.

Numeral 11 designates a sensor for sensing the status of the facsimile apparatus, and 12 a cutting unit for cutting the recording paper. The cutting unit 12 includes a cutter motor 12a which drives a cutter. Numeral 13 denotes a central control unit for administering overall control of the embodiment. The central control unit 13 comprises a main CPU 13a for administering overall control of the facsimile apparatus in accordance with the programs stored in the ROM 7, and an input-/output (I/O) port for the main CPU 13a.

Numeral 14 represents a power supply for operating various components of the facsimile apparatus of this embodiment. The power supply 14 includes a high-energy power supply 14a which supplies current to the various relays 2a, recording motor 4a, thermal head 4b, reading motor 5a, fluorescent lamp 5b, stamping plunger 6 and cutter motor 12, an analog power supply 14b which supplies current to analog circuits such as the modem controller 3, and a digital power supply 14c which supplies current to digital circuits.

FIG. 2 is a diagram showing the connection of the high-energy power supply mainly for the thermal head and motor of the facsimile apparatus of this embodiment.

In FIG. 2, numeral 15 denotes a quartz oscillator for forming a system clock serving as the operating clock signal of the main CPU 13a, 16 a quartz oscillator for forming a system clock serving as the operating clock signal of the subordinate CPU 4c, and 17 a motor driver for driving the various motors of the facsimile apparatus by supplying them with a large amount of power.

Numeral 1-3 in FIG. 2 designates the main-CPU clock, namely an external output signal of the system clock driving the main CPU 13a, with the quartz oscillator 15 serving as the source of oscillation. Numeral 2-3 represents the subordinate-CPU signal (operating signal) outputted from the I/O port of the CPU 4c at a fixed period by control shown in FIG. 8, described later.

Numeral 2-7 represents a strobe signal which the subordinate CPU 4c sends to the thermal head 4b in order to record an image to be outputted, and 2-8 a control signal which the subordinate CPU 4c sends to the motor driver 17 in order to operate the connected motors 4a, 5a and 12a. Numeral 35 denotes a power-supply control signal for monitoring the main-CPU clock 1-3 and the subordinate-CPU signal (operating signal) 2-3 and for turning off the high-energy power supply 14a when an abnormality is sensed. Numeral 6-7 designates a power-supply line by which the high-energy power supply 14a supplies the thermal head 4b with electrical energy, 6-8 a power-supply line by which the high-energy power supply 14a supplies the motor driver 17 with electrical energy, 6-12 a power-supply line by which the high-energy power supply 14a supplies the fluorescent lamp 5b with electrical energy, 6-13 a power-supply line by which the high-energy power supply 14a supplies the various relays 2a with electrical energy, and 6-14 a power-supply line by which the high-energy power supply 14a supplies the stamping plunger 6 with electrical energy. Numeral 8-9 represents a motor excitation signal by which the motor driver 17 drives the reading motor 5a, 8-10 represents a motor excitation signal by which the motor driver 17 drives the recording motor 54, and 8-11 represents a motor excitation signal by which the motor driver 17 drives the cutter motor 12a.

FIG. 3 is a detailed block diagram illustrating the principal portion of the runaway sensing circuit 9.

In FIG. 3, numeral 20 denotes the principal portion of the runaway sensing circuit.

The principal portion 20 of the runaway sensing circuit includes a comparing register 21 in which a numerical value can be written for determining whether an abnormal state or a normal state is indicated by the result of comparing the signal periods of the main-CPU clock 1-3 and subordinate-CPU signal 2-3, a frequency dividing circuit 22 for frequency-dividing the main- CPU clock 1-3 in order to facilitate a comparison between the period of this signal and that of the subordinate-CPU signal 2-3, a counter 23 which counts the output signal from the frequency dividing circuit 22 and which is reset by the subordinate-CPU signal 2-3, an overflow holding circuit 24 which, when the counter 23 overflows, records and holds this fact and informs a clock abnormality sensing circuit 26, and a coincidence/non-coincidence detecting circuit 25 for detecting coincidence between the value of the count in counter 23 and the value in the comparing register 21 and for sending a signal indicative of this coincidence to the clock abnormality sensing circuit 26.

When (a) the clock abnormality sensing circuit 26 is informed by the overflow holding circuit 24 of the fact that an overflow has occurred and (b) the subordinate-CPU signal 2-3 has entered the clock abnormality sensing circuit 26 for two consecutive periods without the coincidence/non-coincidence detecting circuit 25 having sensed coincidence between the value of the count and the value in the comparing register 21, the clock abnormality sensing circuit 26 renders a decision to the effect that the subordinate CPU 4c is in an abnormal state, turns off the high-energy power supply 14a and continues to hold this state until a reset signal enters or the set value in the comparing register is written in again.

Numeral 27 denotes a data signal which sets the register value of the comparing register 21 outputted by the I/O port 13b of the main CPU 13a, and 210 an output signal from the clock abnormality sensing circuit 26. This signal turns off the high-energy power supply 14a when the ratio of the main-CPU clock 1-3 to the subordinate-CPU signal 2-3 is abnormal.

Figure 4:
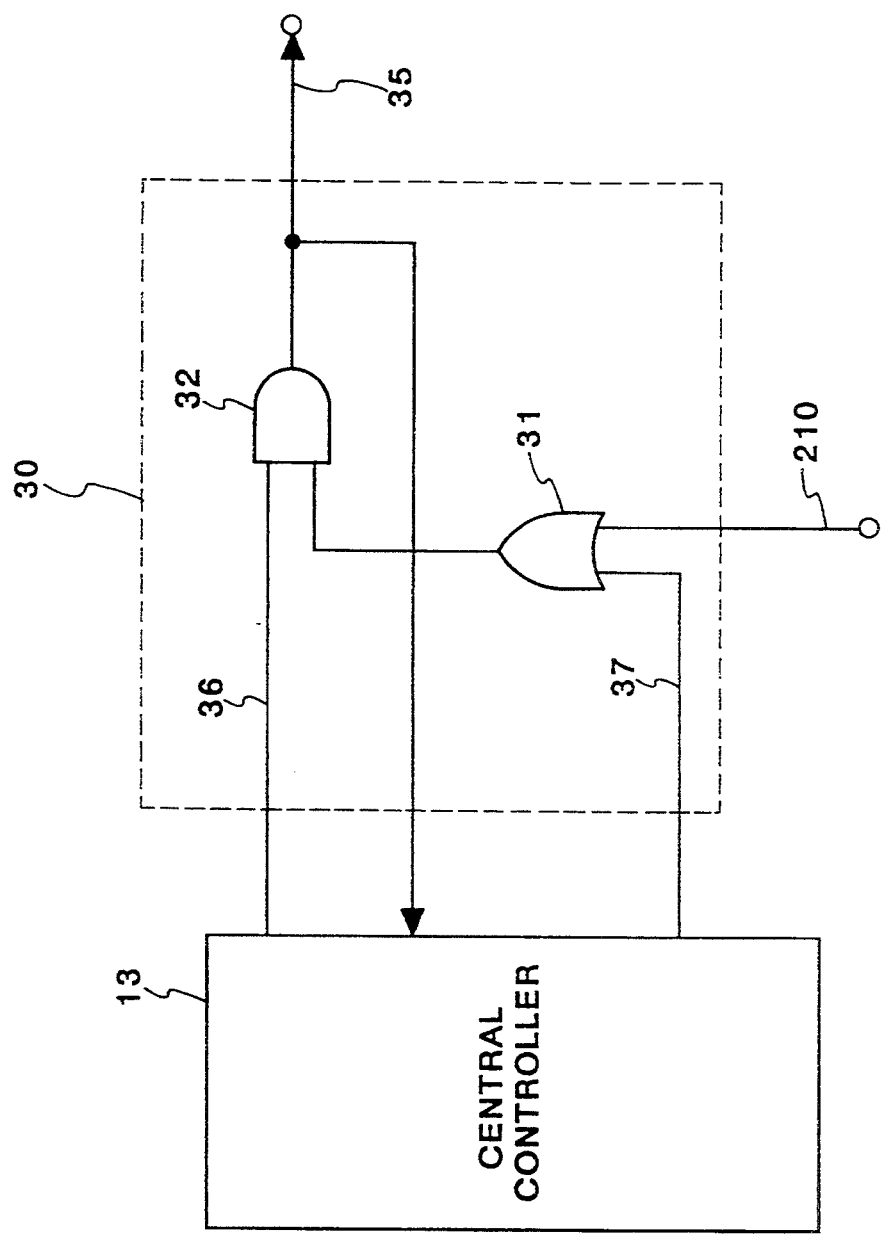
FIG. 4 is a detailed block diagram showing the output portion of the runaway sensing circuit in this embodiment.

FIG. 4 is a detailed block diagram showing the output portion of the runaway sensing circuit 9.

In FIG. 4, numeral 30 denotes the output portion of the runaway sensing circuit comprising an OR gate 31 and an AND gate 32.

Numeral 35 designates a power-supply control signal from the output portion 30 of the runaway sensing circuit. This signal controls the on/off state of the high-energy power supply 14a. Numeral 36 represents a power-supply off signal from the I/O port 13b of the main CPU 13a. By making the power-supply off signal 36 logical "0", the power-supply control signal 35 is forcibly made logical "0" and the high-energy power supply 14a is forcibly turned off under the control of the main CPU 13a.

Numeral 37 denotes a signal, which prevents the power supply from being turned off, from the I/O port 13b of the main CPU 13a. By making this signal logical "1", on/off control of the high-energy power supply 14a is decided solely by the power-supply off signal 36. Therefore, even if the output signal 210 from the runaway sensing circuit 9 is in a state for turning off the high-energy power supply 14a, the latter will not be turned off providing the signal 37 is at logical "1". Thus, this signal is for nullifying the function of the runaway sensing circuit 9.

The power-supply control signal 35 is applied to the input side of the I/O port 13b. The arrangement is such that when a clock abnormality or the like occurs and the high-energy power supply 14a turns off, the main CPU 13a is capable of sensing such fact.

Operation for controlling the high-energy power supply 14a at the time of runaway in this embodiment constructed as set forth above will now be described.

Figure 8:
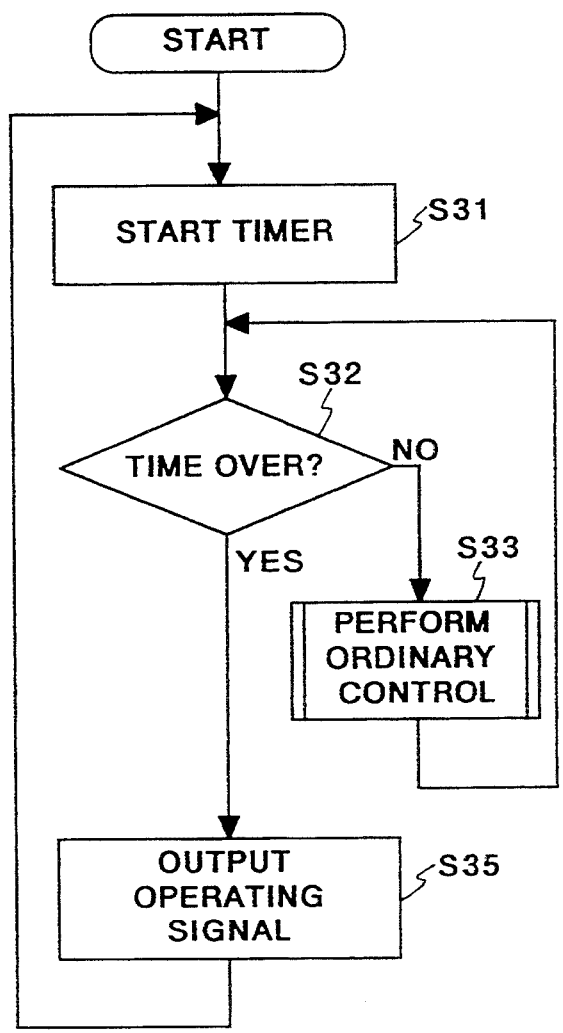
FIG. 8 is a flowchart for controlling the output of a signal from the subordinate CPU.

FIG. 5 is a flowchart illustrating a control operation for rendering the runaway sensing circuit 9 of main CPU 13a effective (i.e., for placing the circuit 9 in a state where it is capable of sensing runaway). FIG. 6 is a flowchart illustrating the operation of the runaway sensing circuit 9 when a clock abnormality occurs. FIG. 7 is a flowchart illustrating operation when the set value in the comparing register 21 is changed without turning off the high-energy power supply 14a of the main CPU 13a. FIG. 8 is a flowchart illustrating output control of the subordinate-CPU clock of subordinate CPU 4c.

Operation for rendering the runaway sensing circuit 9 of main CPU 13a effective will now be described with reference to FIG. 5.

First, at step S1 of the flowchart, the main CPU 13a writes a numerical value in the comparing register 21 via signal line 27. The numerical value is for determining whether the result of comparing the signal periods of both the main-CPU clock 1-3 and the subordinate-CPU signal 2-3 is indicative of a normal state or an abnormal state. Next, at step S2, the main CPU 13a sets the I/O port 13b and makes the signal 36, which is for forcibly turning off the high-energy power supply 14a, logical "1". This is followed by step S3, at which the signal 37 from the I/O port 13b for preventing power-supply turn-off is made logical "0" to establish a mode in which on/off control of the high-energy power supply 14a is performed by the output signal 210 from the runaway sensing circuit 9.

When power is being supplied to the apparatus, the power supplies 14b, 14c other than the high-energy power supply 14a are in the active state. Consequently, this is a state in which the main-CPU clock signal 1-3 from the main CPU 13a and the subordinate-CPU signal 2-3 from the subordinate CPU 4c are being outputted at all times. These two signals are delivered to the runaway sensing circuit 9. Accordingly, the runaway sensing circuit 9 begins comparison processing at step S5.

More specifically, during one period of the subordinate-CPU signal 2-3, the coincidence/non-coincidence detecting circuit 25 constantly determines whether the frequency-divided output (the counted value in counter 23) of the main-CPU clock 1-3 from the frequency dividing circuit 22 is the same as the set numerical value in the comparing register 21. When the two compared values coincide, the detecting circuit 25 delivers a coincidence signal to the clock abnormality sensing circuit 26.

When the coincidence signal is delivered thereto, the clock abnormality sensing circuit 26 decides that the ratio of the subordinate-CPU signal 2-3 to the main-CPU clock 1-3 is normal and turns on the output signal 210 from the runaway sensing circuit 9. As a result, the high-energy power supply 14a is activated, current is supplied and the facsimile apparatus begins operating.

In a case where the count in counter 23 overflows and a case where the subordinate-CPU signal 2-3 enters continuously without the coincidence/non-coincidence detecting circuit 25 detecting coincidence between the counter 23 and the comparing register 21, the clock abnormality sensing circuit 26 decides that either the subordinate-CPU signal 2-3 or the main-CPU clock 1-3 is abnormal and turns off the output signal 210 from the runaway sensing circuit 9.

When the output signal 210 is turned off, the output of the OR gate 31 also turns off and so does the output of the AND gate 32, i.e., the power-supply control signal 35. As a result, supply of the current from the high-energy power supply 14a is halted.

This state is indicated at steps S10 and S11 in the flowchart of FIG. 6.

The power-supply control signal 35 is outputted also to the input side of the I/O port 13b of main CPU 13a. The main CPU 13a is capable of detecting, at step S12, cessation of the current supply from the high-energy power supply 14a. Upon having detecting this, the main CPU 13a executes the necessary post-processing at step S13, such as informing of the occurrence of the abnormality and halting the operation of other components.

This off state is not cancelled so long as the clock abnormality sensing circuit 26 is not reset or the numerical value in the comparing register 21 is not rewritten by the central controller 13. In other words, once an abnormal state develops, the output signal 210 from the principal portion 20 of the runaway sensing circuit will not turn on even if the frequency ratio of the subordinate-CPU signal 2-3 to the main-CPU clock 1-3 should return to a state of normalcy.

When the numerical value set in the comparing register 21 of the runaway sensing circuit 9 is changed, the range for detecting an abnormal state can be changed and the range for generating the power-supply control signal 35 (the output signal 210) can be made variable.

Reference will now be had to FIG. 7 to describe processing for changing the abnormal-state detection range by changing the numerical value set in the comparing register 21 of runaway sensing circuit 9 according to this embodiment.

In the runaway sensing circuit 9 of this embodiment, a numerical value is written in the comparing register 21, the subordinate-CPU signal 2-3 is applied as an input, and the high-energy power supply 14a cannot be turned on unless the value of the count in counter 23 and the set numerical value in the comparing register 21 coincide, as described above. As a consequence, if the numerical value of the comparing register 21 is rewritten while the facsimile apparatus is in operation, the power supply momentarily assumes the "off" state. Therefore, after the start of processing for changing the register value at step S20 in FIG. 7, the program proceeds to step S21. Here the signal 37 from the I/O port 13b preventing turn-off of the power supply is made logical "1" to effect control such that the high-energy power supply 14a will not turn off, and it is arranged so that on/off control of the high-energy power supply 14a will not be carried out by the output signal 210 from the runaway sensing circuit 9 (i.e., so that the output signal 210 of the runaway sensing circuit 9 is rendered ineffective).

Next, the numerical value in the comparing register 21 is changed to a desired numerical value at step S22. Step S23 calls for the system to wait for a time equivalent to one period of the subordinate-CPU signal 2-3. The reason for this is as follows: Even though the output signal 210 has been turned off, the value of the count in counter 23 is reset by the next subordinate-CPU signal 2-3, coincidence is detected by the coincidence/non-coincidence detecting circuit 25 and the power-supply control signal 35 will not turn off for the period of time that the output signal 210 is on.

When the time equivalent to one period of the subordinate-CPU signal 2-3 elapses, the signal 37 which prevents turn-off of the high-energy power supply 14a is made logical "0", on/off control of the high-energy power supply 14a is carried out by the output signal 210 from the runaway sensing circuit 9, and the program returns to step S25 to again effect a transition to runaway sensing processing by the runaway sensing circuit 9.

As a result of this control, the high-energy power supply 14a is continuously maintained in the on state.

Lastly, reference will be had to FIG. 8 to describe output control of the subordinate-CPU signal 2-3 in the subordinate CPU 4c.

When the program is being executed correctly, the subordinate CPU 4c starts a real timer at step S31. When the real timer is started, the subordinate CPU 4c subsequently is interrupted whenever the timer runs out of time so as to be informed whenever a predetermined time period elapses. Accordingly, the program proceeds to step S33 from step S32 until the interrupt is applied (i.e., until the timer runs out of time). Ordinary drive-system control is executed at step S33.

Since the interrupt is applied when the real timer runs out of time, the program proceeds from step S32 to step S35, where the output port of the peripheral I/O port that is for the subordinate-CPU signal 2-3 is set for a fixed period of time and the subordinate-CPU signal 2-3 is outputted. The program then returns to step S31 to prepare for the next time-out in the real timer. During normal operation, the subordinate CPU 4c constantly executes the foregoing processing and continues to output the subordinate-CPU signal 2-3 at a predetermined period.

Figure 9:
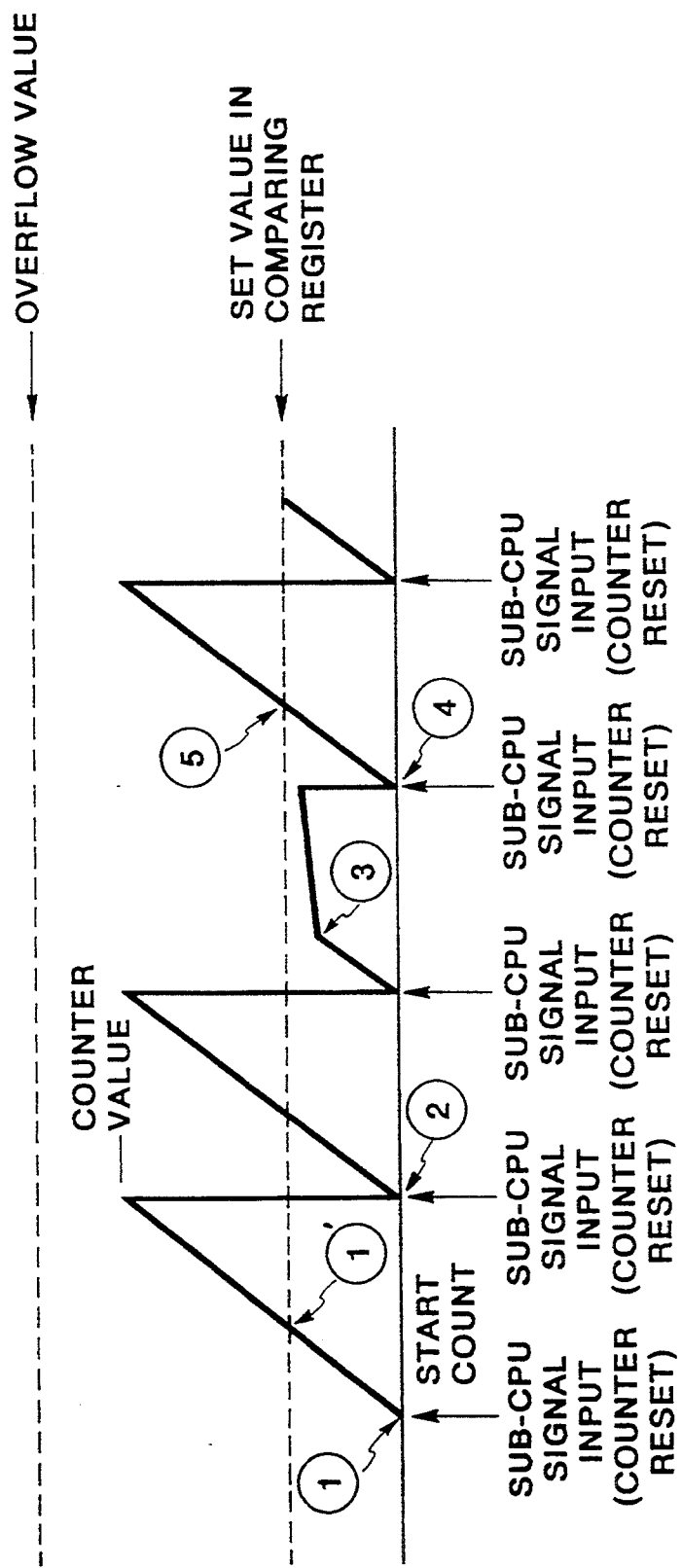
FIG. 9 is an operation timing chart mainly for a case where the clock of a main CPU develops an abnormality and a high-energy power supply is turned off.
Figure 10:
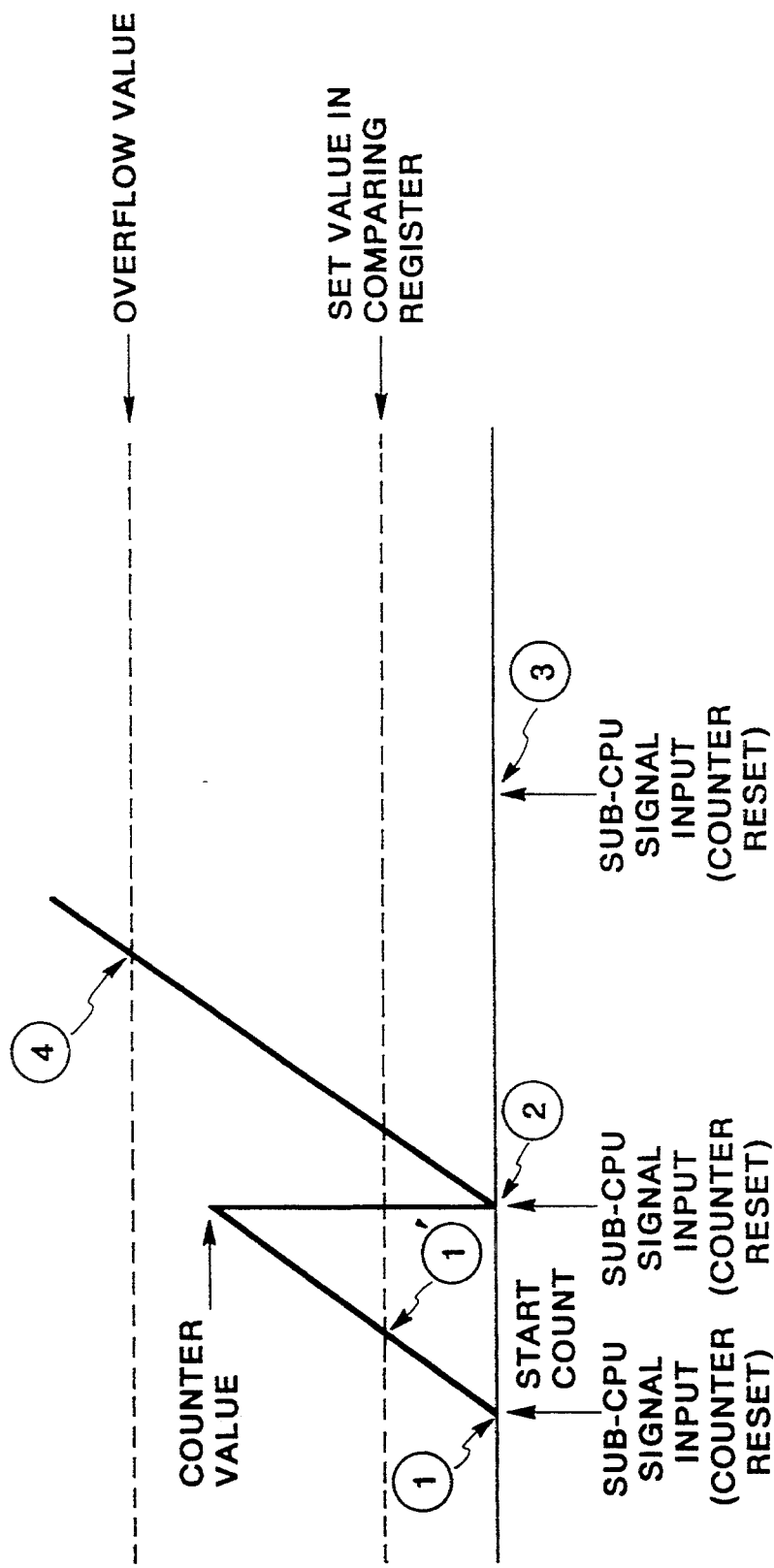
FIG. 10 is an operation timing chart mainly for a case where the signal of a subordinate CPU develops an abnormality and a high-energy power supply is turned off.

FIGS. 9 and 10 illustrate operation timing charts of the runaway sensing circuit 9 described above.

FIG. 9 is an operation timing chart for a case where the high-energy power supply 14a is cut off by the action of the runaway sensing circuit 9, as when the main CPU clock 1-3 of the main CPU 13a oscillates abnormally, and FIG. 10 is an operation timing chart for a case where the high-energy power supply 14a is cut off by the action of the runaway sensing circuit 9, as when the output of the subordinate-CPU signal 2-3 becomes abnormal.

In FIG. 9, first the main-CPU signal 13a writes a numerical value in the comparing register 21 and the subordinate-CPU signal 2-3 arrives as an input, whereupon the counter 23 is reset to establish the state shown at ①. The counter 23 starts counting the main-CPU clock 1-3 (the output of the frequency dividing circuit 22). As the count continues and the counted value exceeds the set value of the comparing register 21, as indicated at ①', the coincidence/non-coincidence detecting circuit 25 detects coincidence, so informs the clock abnormality sensing circuit 26 and produces the output signal 210. As a result, the power-supply control signal 35 is outputted and the high-energy power supply 14a is turned on.

Though the counter 23 continues counting, it is cleared at the moment the next subordinate-CPU signal 2-3 enters and then starts counting the main-CPU clock 1-3 from "0" again, as shown at ②. In this case output of the power-supply control signal 35 continues and the high-energy power supply 14a remains on. When conditions are normal, the foregoing operation is executed repeatedly.

If oscillation of the main-CPU clock 1-3 stops or the period of oscillation becomes too long, the counted value in counter 23 does not increase fully and does not attain the set value in the comparing register 21 by the time the next subordinate-CPU signal 2-3 arrives, as indicated at ③. If the subordinate CPU 4c malfunctions or the period of the subordinate-CPU signal 21∝3 becomes too short, the value of the count in the counter 23 does not attain the set value in the comparing register 21. As a consequence, when the next subordinate-CPU signal 2-3 arrives, the clock abnormality sensing circuit 26 senses an abnormal state at ④ and turns off the output signal 210. As a result, the power-supply control signal 35 turns off and the high-energy power supply 14a is turned off.

When this state is attained, the high-energy power supply 14a will not turn on, as long as the numerical value in comparing register 21 is not written in again, even if the oscillation of the main-CPU clock 1-3 returns to normal and the state indicated at ⑤ is established.

The situation shown in FIG. 10 will now be described.

In this case also, operation when conditions are normal is similar to that shown in FIG. 9, and therefore operation from ① to ①', ② is repeated.

The value of the count in counter 23 overflows under these conditions in a case where the subordinate CPU 4c develops a malfunction such as runaway so that the subordinate-CPU signal 2-3 fails to be outputted or is outputted with a period that is too long, or in a case where the period of the main-CPU clock 1-3 becomes too short owing to an abnormality in the operating clock of the main CPU 13a.

The clock abnormality sensing circuit 26 senses an abnormality at ④ and turns off the output signal 210. As a result, the power-supply control signal 35 is turned off and the high-energy power supply 14a is turned off. When this state is established, the high-energy power supply 14a will not turn on, as long as the numerical value in comparing register 21 is not written in again, even if the output of the subordinate-CPU signal 2-3 returns to normal at ③.

The present embodiment described above has the following advantages and effects:

(1) A simple and inexpensive circuit is provided for comparing the period of the subordinate-CPU signal 2-3 from the subordinate CPU 4c, which controls the recording system such as the thermal head and motor, and the period of the main-CPU clock 1-3. As a result, the operations of the main CPU and subordinate CPU are monitored simultaneously, runaway in both of these CPU's is sensed promptly, and the high-energy power supply 14a is turned off to prevent an accident such as the emission of smoke or burning before it occurs. Thus, the facsimile apparatus of the invention is very safe.

(2) The conditions for turning off the high-energy power supply 14a can be changed. This makes it possible to deal appropriately with a case in which the period of the subordinate-CPU signal 2-3 changes with respect to that of the main-CPU clock 1-3. For example, in a case where the subordinate CPU 4c is controlling either the thermal head or the motor and a case where the subordinate CPU 4c is controlling both of these simultaneously when such simultaneous control by the subordinate CPU 4c is possible, it is possible to take the appropriate measures even if the period of the subordinate-CPU signal 2-3 differs.

(3) The arrangement is such that when the frequency ratio of the subordinate-CPU signal 2-3 to the main-CPU clock 1-3 attains a value considered abnormal, the power supply is kept turned off as long as a trigger signal from the main CPU 13a is not transmitted. As a result, even if the subordinate-CPU signal 2-3 or main CPU clock 1-3 repeatedly exhibits normal and abnormal conditions in intermittent fashion, the high-energy power supply 14a can be prevented from being repeatedly turned on and off intermittently, thereby preventing such abnormal operations of the facsimile apparatus as loss of synchronization in the motor drive circuit or random loss of data in a print-out.

(4) A trigger signal for nullifying the off-state of the power supply is adopted as a signal for writing the numerical value in the comparing register 21. This makes it possible to simplify the circuit arrangement as well as the control software.

(5) The arrangement is such that the off state of the high-energy power supply 14a established by the runaway sensing circuit 9 is capable of being sensed by the main CPU 13a. As a result, processing which follows turn-off of the high-energy power supply 14a can be executed quickly and appropriately.

(6) Means are provided for turning on the high-energy power supply 14a regardless of the state of the runaway sensing circuit. This makes it possible to rewrite the value in the comparing register 21 while the high-energy power supply is kept turned on. As a result, operation of the subordinate CPU 4c is allowed a certain latitude.

In accordance with the present invention as described above, a simple and inexpensive circuit is provided for comparing the period of the operating signal of the subordinate CPU and the period of the clock which operates the main CPU. As a result, the main CPU and subordinate CPU are monitored simultaneously, runaway in both of these CPU's is sensed promptly, and the driving power supply of the object under the control of the subordinate CPU can be turned off to prevent an accident such as the emission of smoke or burning before it occurs.

The arrangement is such that after an abnormality has occurred and the power supply is turned off, the power supply is kept turned off as long as a trigger signal from the main CPU is not transmitted. As a result, even if the subordinate CPU or main CPU repeatedly exhibits normal and abnormal conditions in intermittent fashion, it is possible to prevent such abnormal operations of the facsimile apparatus as loss of synchronization in the motor drive circuit or random loss of data in a print-out, as can be caused by repeatedly turning the power supply on an off intermittently.

By providing means through which the main CPU senses turn-off of the power supply, processing which follows turn-off of the power supply can be executed in an appropriate manner.

The present invention is not limited to a facsimile apparatus but is applicable also to a variety of image processing apparatus, such as copiers and printers, in which control is performed by two computers or microcomputers.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
main control means for controlling overall operation of the apparatus, and outputting a clock signal having a first predetermined period;
sub-control means for controlling operation of a particular part of the apparatus, and outputting an operation signal having a second predetermined period which is longer than the first predetermined period;

counting means for counting the number of the clock signals output from said main control means, the counted number of the clock signals being reset whenever the operation signal is output from said sub-control means or the second period of the operation signal is expired; and power-supply control means for turning off a driving power supply to the particular part of the apparatus controlled by said sub-control means, when the counted number of the clock signals is less than a first reference value by the time the second period of the operation signal is expired or more than a second reference value before the second period is expired.

2. The apparatus according to claim 1, wherein the first reference value is a variable.

3. The apparatus according to claim 1, further comprising inhibiting means for inhibiting the turning off of the driving power supply to the particular part of the apparatus by said power-supply control means.

4. The apparatus according to claim 1, further comprising turn-off means for turning off the driving power supply to the particular part of the apparatus, regardless of the counted number of the clock signals.

5. The apparatus according to claim 1, further comprising printing means for printing an image on a printing sheet as the particular part of the apparatus.

6. The apparatus according to claim 1, wherein said main control means halts the operation of the apparatus in accordance with the turning off of the driving power supply to the particular part.

7. An image processing comprising:

main control means for controlling overall operation of the apparatus, and outputting a clock signal having a first predetermined period;

sub-control means for controlling operation of a particular part of the apparatus, and outputting an operation signal having a second predetermined period which is longer than the first predetermined period;

counting means for counting the number of the clock signals output from said main control means, the counted number of the clock signals being reset whenever the operation signal is output from said sub-control means or the second period of the operation signal is expired; and power-supply control means for turning off a driving power supply to the particular part of the apparatus controlled by said sub-control means, when the counted number of the clock signals is outside of a reference range by the time the second period of the operation signal is expired, wherein the reference range is changeable by said main control means.

8. The apparatus according to claim 7, wherein said power-supply control means turns off the driving power supply to the particular part of the apparatus, when the counted number of the clock signals is less than a first reference value or more than a second reference value.

9. The apparatus according to claim 7, further comprising inhibiting means for inhibiting the turning off of the driving power supply to the particular part of the apparatus by said power supply control means.

10. The apparatus according to claim 7, further comprising turn-off means for turning off the driving power supply to the particular part of the apparatus, regardless of the counted number of the clock signals.

11. The apparatus according to claim 7, further comprising printing means for printing an image on a printing sheet as the particular part of the apparatus.

12. The apparatus according to claim 7, wherein said main control means halts the operation of the apparatus in accordance with the turning off of the driving power supply to the particular part of the apparatus.

13. An image processing apparatus comprising:

main control means for controlling overall operation of the apparatus, and outputting a control signal having a first predetermined period.

sub-control means for controlling operation of a particular part of the apparatus, and outputting an operation signal having a second predetermined period which is longer than the first predetermined period;

counting means for counting the number of the clock signals output from said main control means, the counted number of the clock signals being reset whenever the operation signal is output from said sub-control means or the second period of the operation signal is expired;

power-supply control means for turning off a driving power supply to the particular part of the apparatus controlled by said sub-control means, when the counted number of the clock signals is outside of a reference range by the time the second period of the operation signal is expired, wherein said main control means halts the operation of the apparatus in accordance with the turning off of the driving power supply to the particular part of the apparatus by said power-supply control means.

14. The apparatus according to claim 13, wherein the reference range is a variable.

15. The apparatus according to claim 13, wherein said power-supply control means turns off the driving power supply to the particular part of the apparatus, when the counted number of the clock signals is less than a first reference value or more than a second reference value.

16. The apparatus according to claim 13, further comprising inhibiting means for inhibiting the turning off of the driving power supply to the particular part of the apparatus by said power-supply control means.

17. The apparatus according to claim 13, further comprising turn-off means for tuning off the driving power supply to the particular part of the apparatus, regardless of the counted number of the clock signals.

18. The apparatus according to claim 13, further comprising printing means for printing an image on a printing sheet as the particular part of the apparatus.

19. An image processing method comprising:

a main control step of controlling overall operation of the apparatus, and outputting a clock signal having a first predetermined period;

a sub-control step of controlling operation of a particular part of the apparatus, and outputting an operation signal having a second predetermined period which is longer than the first predetermined period;

a counting step of counting the number of the clock signals output at said main control step, the counted number of the clock signals being reset whenever the operation signal is output at said sub-control step or the second period of the operation signal is expired; and a power-supply control step of turning off a driving power supply to the particular part of the apparatus controlled at said sub-control step, when the counted number of the clock signals is less than a first reference value by the time the second period of the operation signal is expired or more than a second reference value before the second period is expired.

20. The method according to claim 19, wherein the first reference value is a variable.

21. The method according to claim 19, further comprising an inhibiting step of inhibiting the turning off of the driving power supply to the particular part of the apparatus at said power-supply control step.

22. The method according to claim 19, further comprising a turn-off step of turning off the driving power supply to the particular part of the apparatus, regardless of the counted number of the clock signals.

23. The apparatus according to claim 19, further comprising a printing step of printing an image on a printing sheet as the particular part of the apparatus.

24. The apparatus according to claim 19, wherein at said main control step, the operation of the apparatus is halted in accordance with the turning off of the driving power supply to the particular part of the apparatus.

25. An image processing method comprising:
a main control step of controlling overall operation of the apparatus, and outputting a clock signal having a first predetermined period;
a sub-control step of controlling operation of a particular part of the apparatus, and outputting an operation signal having a second predetermined period which is longer than the first predetermined period;
a counting step of counting the number of the clock signals output at said main control step, the counted number of the clock signals being reset whenever the operation signal is output at said sub-control step or the second period of the operation signal is expired; and
a power-supply control step of turning off a driving power supply to the particular part of the apparatus controlled at said sub-control step, when the counted number of the clock signals is outside of a reference range by the time the second period of the operation signal is expired, wherein the reference range is changeable at said main control step.

26. The method according to claim 25, wherein at said power-supply control step, the driving power supply to the particular part of the apparatus is turned off, when the counted number of the clock signals is less than a first reference value or more than a second reference value.

27. The method according to claim 25, further comprising an inhibiting step of inhibiting the turning off of the driving power supply to the particular part of the apparatus at said power-supply control step.

28. The method according to claim 25, further comprising a turn-off step for turning off the driving power supply to the particular part of the apparatus, regardless of the counted number of the clock signals.

29. The method according to claim 25, further comprising a printing step of printing an image on a printing sheet as the particular part of the apparatus.

30. The method according to claim 25, wherein at said main control step, the operation of the apparatus is halted in accordance with the turning off of the driving power supply to the particular part of the apparatus.

31. An image processing method comprising:
a main control step of controlling overall operation of the apparatus, and outputting a clock signal having a first predetermined period;
a sub-control step of controlling operation of a particular part of the apparatus, and outputting an operation signal having a second predetermined period which is longer than the first predetermined period;
a counting step of counting the number of the clock signals output at said main control step, the counted number of the clock signals being reset whenever the operation signal is output at said sub-control step or the second period of the operation signal is expired;
a power-supply control step of turning off a driving power supply to the particular part of the apparatus controlled at said sub-control step, when the counted number of the clock signals is outside of a reference range by the time the second period of the operation signal is expired, wherein as said main control step, the operation of the apparatus is halted in accordance with the turning off of the driving power supply to the particular part of the apparatus at said power-supply control step.

32. The method according to claim 31, wherein the reference range is a variable.

33. The method according to claim 31, wherein at said power-supply control step, the driving power supply to the particular part of the apparatus is turned off, when the counted number of the clock signals is less than a first reference value or more than a second reference value.

34. The method according to claim 31, further comprising an inhibiting step of inhibiting the turning off of the driving power supply to the particular part of the apparatus at said power-supply control step.

35. The method according to claim 31, further comprising a turn-off step of turning off the driving power supply to the particular part of the apparatus, regardless of the counted number of the clock signals.

36. The method according to claim 31, further comprising a printing step of printing an image on a printing sheet as the particular part of the apparatus.

* * * * *

UNITED STATES PATENT AND TRADEMARK OFFICE
CERTIFICATE OF CORRECTION

PATENT NO. : 5,436,731

DATED : July 25, 1995

INVENTOR(S) : SHIGEO MIURA

It is certified that error appears in the above-identified patent and that said Letters Patent is hereby corrected as shown below:

COLUMN 7

Line 9, "detecting" should read --detected--.

COLUMN 9

Line 1, "signal 21∝3" should read --signal 2-3--.

COLUMN 11

Line 35, "processing" should read --processing apparatus--.
Line 68, "power supply" should read --power-supply--.

COLUMN 12

Line 26, "expired;" should read --expired; and--.

COLUMN 14

Line 28, "expired;" should read --expired; and--.

Signed and Sealed this

Twenty-first Day of November, 1995

Attest:

BRUCE LEHMAN

Attesting Officer

Commissioner of Patents and Trademarks